(12) United States Patent
Bouwhuis

(10) Patent No.: US 6,950,730 B1
(45) Date of Patent: Sep. 27, 2005

(54) SYSTEM FOR CERTIFIED USE OF ELECTRICAL ENERGY

(76) Inventor: Egbert A. J. Bouwhuis, Spijkerstraat 116, NL-6828 DN Arnhem (NL)

( * ) Notice: Subject to any disclaimer, the term of this patent is extended or adjusted under 35 U.S.C. 154(b) by 57 days.

(21) Appl. No.: 10/111,697

(22) PCT Filed: Nov. 10, 2000

(86) PCT No.: PCT/NL00/00825

§ 371 (c)(1),
(2), (4) Date: Sep. 25, 2002

(87) PCT Pub. No.: WO01/35351

PCT Pub. Date: May 17, 2001

(30) Foreign Application Priority Data

Nov. 12, 1999 (NL) .................................. 1013568

(51) Int. Cl.⁷ ...................... G05D 11/00; G05D 17/00; G05D 3/12; G05D 5/00; G06K 5/00
(52) U.S. Cl. ..................................... 700/297; 235/380
(58) Field of Search .................... 700/22, 292, 297; 705/63, 412; 235/380, 381; 340/5.4, 5.42

(56) References Cited

U.S. PATENT DOCUMENTS

| | | | |
|---|---|---|---|
| 4,777,354 A * | 10/1988 | Thomas | 235/380 |
| 4,795,892 A * | 1/1989 | Gilmore et al. | 235/381 |
| 4,803,632 A * | 2/1989 | Frew et al. | 705/412 |
| 4,847,782 A | 7/1989 | Brown, Jr. et al. | |
| 5,146,067 A * | 9/1992 | Sloan et al. | 235/381 |
| 6,191,501 B1 * | 2/2001 | Bos | 307/64 |
| 6,529,883 B1 * | 3/2003 | Yee et al. | 705/63 |
| 6,553,353 B1 * | 4/2003 | Littlejohn | 705/412 |

FOREIGN PATENT DOCUMENTS

| | | | |
|---|---|---|---|
| DE | 19620906 A | 1/1998 | |
| DE | 19620906 A1 | 1/1998 | |
| EP | 0 576 276 A1 * | 12/1993 | G07F 7/00 |
| WO | WO 97/10575 A | 3/1997 | |
| WO | WO 97/10575 A1 | 3/1997 | |

* cited by examiner

Primary Examiner—Leo Picard
Assistant Examiner—Ryan A. Jarrett
(74) Attorney, Agent, or Firm—Banner & Witcoff LTD

(57) ABSTRACT

The invention relates to a system for showing the origin of a certain amount of electrical energy generated by a first method, which is transported via a network which is also adapted to transport energy generated by a second method, wherein the system comprises: at least one device for producing certificates which represent a quantity of energy generated by a first method; a system for transferring the thus produced certificates to consumers from the network; at least one measuring and interrupting device for connecting between the network and a user of electrical energy for proportionally reducing the energy representing the certificate in accordance with the electrical energy flowing through the device and for transmitting electrical energy when the certificate represents energy generated by the first method.

19 Claims, 2 Drawing Sheets

SYSTEM FOR CERTIFIED USE OF ELECTRICAL ENERGY

CROSS REFERENCE TO RELATED APPLICATIONS

This is a U.S. National Phase Application under 35 U.S.C. § 371 and applicant herewith claims the benefit of priority of PCT/NL00/00825 filed Nov. 10, 2000, which was published Under PCT Article 21(2) in English, which claims priority to Dutch Application No. 1013568, filed Nov. 12, 1999, the entire contents of which are incorporated herein by reference.

FIELD OF THE INVENTION

The present invention relates to the certifying of electrical energy generated by a first method.

BACKGROUND INVENTION

The concept of "green energy" has been employed in the Netherlands for several years now. "Green energy" relates to electrical energy which is generated by means of renewable energy sources, such as hydroelectric power, wind power, solar energy and so on. The electricity distribution companies offer their consumers the option of consuming "green energy". The electricity distribution company hereby undertakes to generate at least the amount of electrical energy consumed by the consumer in question by means of renewable energy sources or, when it purchases electrical energy, to ensure that at least the purchased quantity of electrical energy consumed by the relevant consumer is generated in renewable manner. In order to adjust the additional costs of the energy generated in renewable manner a higher amount per consumed energy unit is charged to consumers of "green energy".

Such a system does function, but the interest in consuming "green energy" falls short of expectations.

It is assumed that this is caused partly by the fact that there is little relationship between the consumption of "green energy" and the generation thereof. It will be apparent that it is not possible to connect the consumer of "green energy" directly to a generating unit for renewable forms of energy; transfer of electrical energy takes place over the distribution network for electrical energy, over which is also transported energy which is generated in conventional manner, i.e. by burning fossil fuels or by means of nuclear power.

The problem thus remains of a not very direct link between the consumption of "green energy" and the generation of electrical energy on the basis of renewable energy sources.

BRIEF DESCRIPTION OF THE INVENTION

The object of the present invention is to provide such a system, whereby the relationship between the generation of electrical energy from renewable sources and the consumption of electrical energy generated in such a manner is improved.

This objective is achieved by a system for showing the origin of a certain amount of electrical energy generated by a first method, which is transported via a network which is also adapted to transport energy generated by a second method, wherein the system comprises:

at least one device for producing certificates which represent a quantity of energy generated by a first method;

a system for transferring the thus produced certificates to consumers from the network;

at least one measuring and interrupting device for connecting between the network and a user of electrical energy for proportionally reducing the energy representing the certificate in accordance with the electrical energy flowing through the device and for transmitting electrical energy when the certificate represents energy generated by the first method.

This system attempts to strengthen for the consumer the relationship between electrical energy generated from renewable energy sources and the energy used by the consumer.

Although the application of this system is intended in the first instance for electrical energy generated from a renewable energy source, the system can also be applied for forms of energy generated by other methods; for instance for forms of energy generated by a particular power station.

Situations can be envisaged, wherein consumers residing in the vicinity of a power station have an emotional or economic tie with a particular power station and are prepared to pay a slightly higher price to consume energy generated by this power station.

According to a preferred embodiment the measuring and interrupting device is suitable for connecting between a wall socket and an appliance using electrical energy to be connected via a mains lead.

It is hereby possible for instance to operate an appliance, for instance a lamp or a television set, with electrical energy generated by a first method; the other appliances or lighting fixtures in a house can then make use of electrical energy generated by a different method.

It is however also possible for the measuring and interrupting device to be adapted to connect, in a house service connection, between the power supply connection of the electricity grid and at least one user. The whole house service connection is herein adapted to be operated using electrical energy generated by a first method.

According to another embodiment the measuring and interrupting device is adapted to transmit electrical energy when the certificate does not represent energy generated by the first method.

As follows from the foregoing, the user buys certificates which represent a quantity of electrical energy generated by a first method. By feeding the certificate, or at least the quantity of electrical energy represented by the certificate, into the measuring and interrupting device, the consumer is assured that the electrical energy consumed by him is generated by the first method. Once the quantity of electrical energy represented by a certificate has been used, it is in principle possible for the measuring and interrupting device to interrupt the electricity supply and the consumer to be left in the dark.

It is of course not generally a desirable situation that the measuring and interrupting device is adapted to transmit electrical energy when the certificate does not represent energy generated by the first method.

It is therefore important that the measuring and interrupting device be adapted to transmit electrical energy only after human intervention. The attention of the user is herein drawn to the fact that his electrical energy generated by the first method is "running out" by the lights going out. By for instance pressing a button he can transfer to electrical energy generated by a different method.

It is also possible for the measuring and interrupting device to be adapted to generate a signal when the energy generated by the first method and representing the certificate has the value 0 or has reached a low value. The user is then also provided with the opportunity to transfer to energy generated by a different method or to place a new certificate or to top up a certificate.

The certificates can take diverse forms. In order to be readable for the measuring and interrupting device they can be formed by documents provided with a code. The measuring and interrupting device is then adapted for inputting of the code, wherein inputting of the code results in an increase of the quantity of electrical energy, which is registered by the measuring and interrupting device.

It is of course also possible for the document to take the form of a card provided with a magnetic strip or a "smart chip", so that by swiping the magnetic strip of the card through a card reader arranged in the measuring and interrupting device the quantity of electrical energy represented by the document is transferred to the measuring and interrupting device.

The document can also be formed by an imaginary document, for instance in the form of a code, which can be transferred in electronic manner, for instance via a telecommunications connection such as a telephone line or a coaxial connection, as is generally used for distributing television signals.

It is also possible to use the telecommunications connection as a source of information for the conditions under which the electrical energy in question has been generated. The code is for instance used for this purpose. It is then possible via internet to obtain the relevant information, such as the location of the wind turbine, the type, the average wind power during generating, and so on.

Other communication possibilities are also available apart from this, for instance via internet.

Other attractive preferred embodiments relate to the measuring and interrupting device.

BRIEF DESCRIPTION OF THE DRAWINGS

The present invention will be elucidated hereinbelow with reference to the annexed drawings, in which.

DETAILED DESCRIPTION OF THE INVENTION

Figure 1:
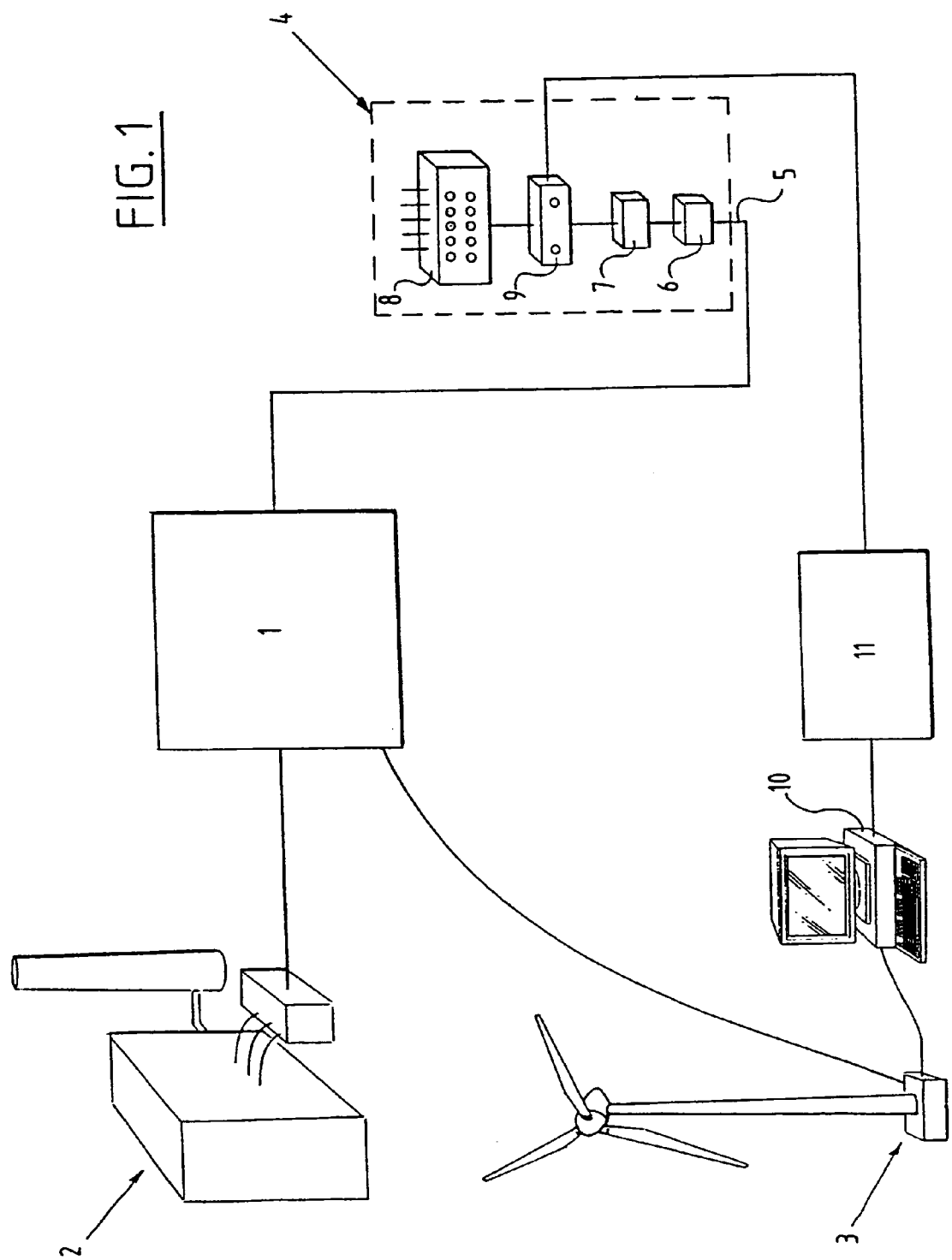
FIG. 1 is a schematic view of a network situation in which the present invention is applied.

FIG. 1 shows an electricity distribution network 1 to which are connected inter alia a conventional power station 2 and a generator 3 driven by a wind turbine, both of which supply electricity for at least a part of the time. A large number of house service connections is further connected to electricity distribution network 1, only one of which, i.e. 4, is shown. The electricity distribution network 1 is of course coupled to other consumers, such as industrial users and offices, and electricity distribution network 1 is coupled to other electricity distribution networks.

The house service connection comprises a feeder cable 5, junction box 6, a kWh-meter 7 and a group distribution box 8. A measuring and interrupting device 9 according to the present invention is placed between kWh-meter 7 and group distribution box 8. With the exception of the measuring and interrupting device, this whole configuration is conventional.

In order to ensure that the user of house service connection 4 consumes only electrical energy generated by wind turbine 3, use is made of the measuring and interrupting device.

Measuring and interrupting device 9 is adapted to read certificates made during generation of electrical energy by wind turbine generator 3.

Wind turbine generator 3 is connected for this purpose to a computer 10 which produces certificates in electronic form representing a certain quantity of electrical energy generated by the wind turbine. In the resent case these are certificates in electronic form, i.e. in the form of codes.

The codes are supplied to a network 11 which is formed for instance by the telephone network or other telecommunications network, such as internet. Documents are supplied to measuring and interrupting device 9 by means of telecommunications network 11.

It is not necessary for this purpose for the measuring and interrupting device 9 to be continuously connected to the telecommunications network; an intermittent connection is sufficient. It is hereby possible for instance to establish a connection only during topping-up of the amount of electrical energy available in the measuring and interrupting device. The user can then order a certificate, for instance via a PC or via a telephone, and have this fed to his measuring and interrupting device. The associated payment, generally represented by the higher cost of "green energy", can herein also be made per kWh.

In the situation drawn here it is assumed that there are a number of certificates present in computer 10. During production of electrical energy by wind turbine 3 a number of certificates is topped up accordingly. All of this must of course take place under the supervision of a generally respected approvals institution, for instance the KEMA (Dutch quality-control institute for electrical materials and appliances).

It is however also conceivable that certificates can be obtained only for the electrical energy being generated at that moment by the wind turbine generator.

Although the above system is described on the basis of an electricity distribution network, it is of course possible to also apply such a system in other distribution networks, the media of which originate from different sources and cannot be recognized on the user side, such as in the distribution of gas or drinking water.

Figure 2:
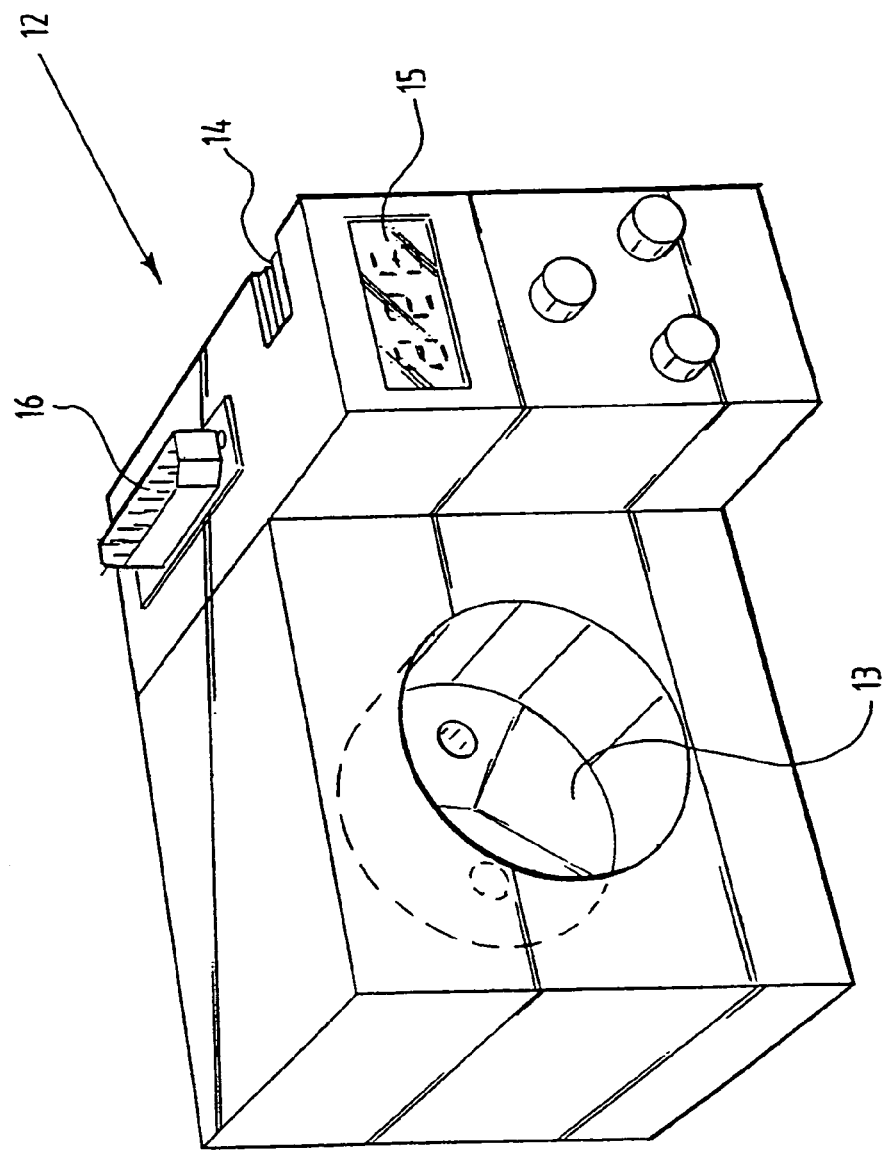
FIG. 2 is a schematic, perspective view of an embodiment of a measuring and interrupting device according to the invention.

FIG. 2 shows an embodiment of a measuring and interrupting device in a different embodiment.

The embodiment shown in FIG. 2 is suitable for connecting between a wall socket and an electricity user connected via a cord. For this purpose the measuring and interrupting device 12 is provided with a sticker part, not shown in the drawing, and a wall socket 13 integrated into the measuring and interrupting device. Arranged on the top side of the housing of measuring and interrupting device 12 is a groove 14 inside which is situated a magnetic card reader. A display 15 is further arranged on top of the housing, and an RS232-connection 16 is arranged on the side of the housing. The magnetic card reader can be used to transfer a document in the form of a code into the memory of the measuring and interrupting device.

Display 15 is used to indicate the remaining amount of electrical energy of the first type to be used. As an alternative to magnet card reader 14 as shown in FIG. 2, use can be made of a computer connection 16. Use can also be made of a keyboard.

What is claimed is:

1. System for showing the origin of a certain amount of electrical energy generated by a first method comprising use of a renewable energy source, which is transported via a network which transports electrical energy generated by a second method comprising use of a source other than a renewable energy source, wherein the system comprises:
   at least one device for producing certificates which represent a quantity of electrical energy generated by the first method;
   a system for transferring the thus produced certificates to consumers through the network;
   at least one measuring and interrupting device for connecting between the network and a consumer of electrical energy for proportionally reducing the energy representing the certificate in accordance with the electrical energy generated by the first method flowing through the device and for transmitting electrical energy generated by the first method when the certificate represents energy generated by the first method;
   wherein the measuring and interrupting device transmits electrical energy generated from the second method when the certificate does not represent energy generated by the first method.

2. System as claimed in claim 1, wherein the renewable energy source is wind power, solar power or hydroelectric power.

3. System as claimed in claim 1 wherein the measuring and interrupting device is suitable for connecting between a wall socket and an appliance using electrical energy, wherein said device connects to said appliance via a mains lead.

4. System as claimed in claim 1 wherein the measuring and interrupting device connects, in a house service connection, between the power supply connection and at least one consumer.

5. System as claimed in claim 1 wherein the measuring and interrupting device transmits the electrical energy generated by the second method only after human intervention.

6. System as claimed in claim 1 wherein the measuring and interrupting device generates a signal when the electrical energy generated by the first method and representing the certificate has reached the value 0 or a low value.

7. System as claimed in claim 1 wherein the certificates take the form of documents provided with a code and that the measuring and interrupting device registers the quantity of electrical energy available on the certificate when the code applied to the document is inputted.

8. System as claimed in claim 7 wherein the code takes the form of a code included in a magnetic strip.

9. System as claimed in claim 7 wherein the code takes the form of a code included in a "smart card".

10. System as claimed in claim 7 wherein the code is transferred via an intermittent telecommunications connection and that the measuring and interrupting device connects to the telecommunications connection.

11. System as claimed in claim 10 wherein the code is transferred via internet.

12. System as claimed in claim 10 wherein the code is transferred by means of a signal superimposed on the electrical energy distribution network.

13. System as claimed in claim 7 wherein information relating to properties of the generation of the amount of energy to which the code relates is provided via electronic means.

14. Measuring and interrupting device for electrical energy, comprising a measuring device for measuring and integrating the electrical energy passing through the measuring and interrupting device and an input device for inputting an amount of electrical energy generated by a first method, wherein the measuring and interrupting device subtracts the integrated electrical energy generated by the first method from the electrical energy represented by a certificate and interrupts the feed of electrical energy when the energy represented by the certificate reaches or approaches the value 0, and wherein the measuring and interrupting devise transmits electrical energy by a second method when the certificate does not represent energy generated by the first method.

15. Measuring and interrupting device for electrical energy as claimed in claim 14 further comprising connecting means for arranging the measuring and interrupting device in the fixed part of an electrical installation.

16. Measuring and interrupting device for electrical energy as claimed in claim 14 further comprising connecting means for connecting the measuring and interrupting device to a wall socket, and by a junction box arranged in the measuring and interrupting device.

17. Measuring and interrupting device as claimed in claim 14 wherein the input device for the certificate comprises a card reader for reading a card provided with a magnetic strip or a chip.

18. Measuring and interrupting device as claimed in claim 14 wherein the input device connects to a telecommunications connection.

19. Measuring and interrupting device for electrical energy as claimed in claim 14 wherein the input device comprises a keyboard for inputting a code.

* * * * *